329;United States Patent Office 3,497,563
Patented Feb. 24, 1970

3,497,563
FLUOROALKYL ETHERS OF ALICYCLIC FLUOROOLEFINS
Virgil W. Gash, Ballwin, Mo., assignor to Monsanto Company, St. Louis, Mo., a corporation of Delaware
No Drawing. Filed Jan. 10, 1966, Ser. No. 519,428
Int. Cl. C07c 41/00, 49/02
U.S. Cl. 260—611    12 Claims

ABSTRACT OF THE DISCLOSURE

Ethers of the formula

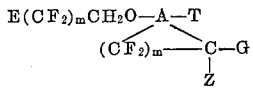

wherein
A is elected from the group consisting of

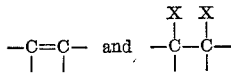

E is selected from the group consisting of hydrogen, fluorine and $CH_2OH$ and may be $CH_2OH$ only when T, G and Z are halogen;
G is selected from the group consisting of fluorine and $OCH_2(CF_2)_mD$ and is fluorine when T is

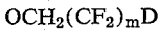

T is selected from the group consisting of bromine, chlorine and $OCH_2(CF_2)_mD$;
X is selected from the group consisting of hydrogen, bromine, chlorine and fluorine;
Z is selected from the group consisting of fluorine and $OCH_2(CF_2)_mD$ and is fluorine when T is

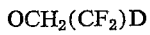

D is selected from the group consisting of hydrogen and fluorine; and
$n$ is a number from 1 to 7 and each $m$ expression is a number from 1 to 12.
These ethers are useful as functional fluids, plasticizers, lubricants, heat transfer media, diffusion pump fluids, damping fluids, filter mediums for air conditioning systems, dielectric materials, flotation agents, greases coolants, etc.

This invention relates to novel fluoroalkyl ethers of alicyclic fluoroolefins, uses thereof and methods of preparation.
United States Patent 2,613,228 (Robert P. Ruh applicant) discloses the preparation of alkyl ethers of alicyclic fluoroolefins wherein alkanols of 1 to 4 carbon atoms are reacted in a nonaqueous system which fluoroolefins. The prior art also teaches that perhaloolefins undergo hydrolysis when an attempt is made to react the perhaloolefins in an aqueous system, see for instance J. Org. Chem., 30, 1629–32 (1965). Therefore it was surprising to find that fluoroalkyl ethers of alicyclic fluoroolefins could be prepared in high yield using aqueous systems.
In accordance with this invention there are provided ethers of the formula

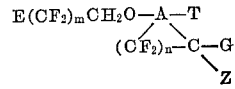

wherein
A is selected from the group consisting of

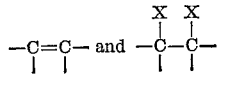

E is selected from the group consisting of hydrogen, fluorine and $CH_2OH$ and may be $CH_2OH$ only when T, G and Z are halogen;
G is selected from the group consisting of fluorine and $OCH_2(CF_2)_mD$ and is fluorine when T is T is selected from the group consisting of bromine, chlorine and $OCH_2(CF_2)_mD$ and is a halogen when G and Z are $OCH_2(CF_2)_mD$.
X is selected from the group consisting of hydrogen, bromine, is chlorine and fluorine;
Z is selected from the group consisting of fluorine and $OCH_2(CF_2)_mD$ and is fluorine when T is D is selected from the group consisting of hydrogen and fluorine; and
$n$ is a number from 1 to 7 and each $m$ expression is a number from 1 to 12.
The products of this invention are most advantageously prepared by reacting a perfluoroalkanol with a perhalocycloolefin in the presence of a base and water. Particularly advantageous yields and desirable purities are obtained when the reaction system is an aqueous reaction system although nonaqueous systems may also be used.
Satisfactory bases for the process of this invention are the hydroxides of the alkali metals of Column Ia of the periodic table (see "Fundamental Chemistry," 2nd ed., H. G. Deming, J. Wiley & Sons, New York, N.Y.). The more convenient and equally satisfactory alkali metal hydroxides of this group are sodium hydroxide and potassium hydroxide.
The solvents employed in the process of this invention are water and the aprotic organic solvents which are water-miscible such as tetrahydrofuran, dioxane and acetonitrile.
The process of this invention is preferably carried out at a temperature range such as −50 degrees to 200 degrees centigrade and most preferably from about 0 degrees to about 100 degrees centigrade for a time interval of about one-half to about 48 hours although preferably from about 10 to about 24 hours. While it is most convenient to carry out this process at atmospheric pressure, subatmospheric and superatmospheric pressures may be employed as appropriate in keeping with the other conditions of the reaction.
The perfluoroalkanol reactants utilized in this invention are readily available. The alkanols may be utilized as either a commercial mixture of perfluoroalkanols or a particular fluoroalkanol. The fluoroalkanols of this invention contain from 1 to 12 carbon atoms. Additionally dihydroxy fluoroalkanols or fluoroglycols containing 1 to 12 carbon atoms are also useful in forming the compositions of this invention.
The perhalo cyclic olefins of this invention contain from 4 to 10 carbon atoms and contain one site of ethylenic unsaturation. The cyclic olefins may either be completely fluorinated compounds or may be fluorinated olefins having chlorine or bromine substitution on the ethylenically unsaturated carbon atoms. Among the useful olefins are 1,2-dichloro-3,3,4,4,5,5-hexafluoro-1-cyclopentene, hexafluorocyclobutene, 1,2-dichloro-3,3,4,4-tetrafluoro-1-cyclobutene, octafluorocyclopentene, decafluorocyclohexene, 1,2-dichloro-3,3,4,4,5,5,6,6-octafluoro-1-cyclohexene, 1,2-dibromo-3,3,4,4-tetrafluoro-1-cyclobutene, 1,2-dibromo-3,3,4,4,5,5-hexafluoro-1-cyclopentene, 1,2-dibromo-3,3,4,4,5,5,6,6-octafluoro-1-cyclohexene and other similar cyclic olefins.
The reaction of the previously described fluoroalkanols with the above-described cyclic olefins results in the structure

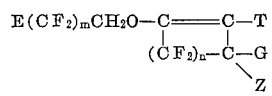

When T is chlorine or bromine, further reaction of the fluoro cyclic olefin with fluoroalkanol results in G and Z also being fluoro ether substituents due to what is believed the directional influence of the chlorine or bromine substituent. Bromine confers better fire resistance to such compounds while the chlorine substituent confers greater thermal stability. However, when T is fluorine further reaction of the fluoro cyclic olefin with the fluoroalkanol results in diethers with G and Z being fluorine while T is a fluoroalkyl ether group.

The resulting di- and trifluoro-alkyl ethers are very useful as functional fluids, e.g., hydraulic fluids, these materials have suitable pour points and viscosity slopes (determined by American Society Testing Materials [ASTM] D341–39) as well as thermal stability to meet the critical requirements of hydraulic fluids. Additionally these materials find use as plasticizers and biological materials in the fields of medicine and agriculture chemicals. These di- and tri-ethers are also useful as lubricants, heat transfer media, diffusion pump fluids, damping fluids, filter mediums for air conditioning systems, dielectric materials, flotation agents, greases and coolants requiring thermal stability, fire retardency and long lasting properties.

When the fluoroalkanol is a dihydric material a monoether of the structure

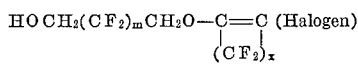

is obtained and a continuation of the reaction results in a polymer of the formula

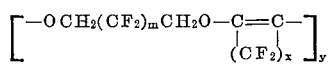

In each case $x$ is equivalent to $n + l$, i.e., a number from 2 to 8, and $y$ is a number from 2 to 1000 or more. The resulting polymer is a flexible fire retardant thermoplastic.

In summary the useful products of this invention are obtained by reacting one molar equivalent of olefin with 1 to 100 molar equivalents of fluoro-alcohol in the presence of 1 to a 100 molar equivalents of base and preferably 1 molar equivalent of olefin with 2 to 3 molar equivalents of alcohol and a like amount of base.

The following examples are illustrative of the invention but are not to be construed as limitations. In these examples all temperatures are in degrees centigrade and all parts are by weight unless otherwise indicated.

EXAMPLE 1

To a solution of 2 grams (0.05 mole) of sodium hydroxide, 16.6 grams (0.05 mole) dodecafluoroheptanol, 20 ml. water, and 20 ml. tetrahydrofuran was added 4.1 grams (0.017 mole) of 1,2-dichloro-3,3,4,4,5,5-hexafluoro-1-cyclopentene. After an initial exothermic reaction, the stirred mixture was refluxed 24 hours. The cooled mixture was poured into water and extracted with two 100 ml. portions of carbon tetrachloride. The organic layer was washed with water, dried over magnesium sulfate and distilled yielding 14.05 grams (54.9 percent yield) of nearly colorless oil boiling point 168–178 degrees centigrade at 0.08 mm. of mercury vapor pressure, with a refractive index of $n_D^{25}$ 1.3421. The product was 1 - chloro-3,3,4,4-tetrafluoro-2,5,5-tri(2,2,3,3,4,4,5,5,6,6,7,7 - dodecafluoroheptyloxy) - 1-cyclopentene which for convenience will be referred to as compound C.

Other triethers were prepared using the procedure of Example 1. For convenience these compounds are identified A, 1-chloro-3,3,4,4-tetrafluoro-2,5,5-tri(2,2,3,3,4,4, 4-heptylfluorobutyloxy)-cyclopentene; B, 1-chloro-3,3,4,4 - tetrafluoro - 2,5,5-tri(2,2,3,3,4,4,5,5-octafluoropentyloxy)-1-cyclopentene; D, 1-chloro-3,3,4,4-tetrafluoro-2,5,5 - tri(2,2,3,3,4,4,5,5,6,6,7,7,8,8,9,9-hexadecafluorononyl-1-cyclopentene; E, 1-chloro-3,3-difluoro-2,4,4-tri(2,2,3,3,4,4,5,5,6,6,7,7 - dodecafluoroheptyloxy)-1-cyclobutene; and F, 1-chloro-3,3,4,4,5,5-hexafluoro-2,6,6-tri(2,2,3,3,4,4,5,5,6,6,7,7 - dodecafluoroheptyloxy)-1-cyclohexene; and the pertinent data is tabulated along with Compound C in Tables I and II below.

EXAMPLE 2

A previously prepared solution of 116 grams (0.35 mole) of dodecafluoroheptanol, 14.4 grams (0.36 mole) of sodium hydroxide, 30 ml. of water, and 100 ml. of tetrahydrofuran was added slowly to a solution of 25 grams (0.154 mole) of perfluorocyclobutene in 40 ml. tetrahydrofuran at −10° C. A strong exothermic reaction was noted during the addition. Stirring was continued overnight at room temperature, then the mixture was heated slowly to reflux conditions for approximately three hours. The reaction product was then recovered as in Example 1. The product was 1,2-di(2,2,3,3,4,4,5,5,6,6,7,7 - dodecafluoroheptyloxy)-3,3,4,4-tetrafluoro-1-cyclobutene which for convenience will be referred to as Compound G.

The physical properties of Compound G and other diethers, 1,2-di(2,2,3,3,4,4,5,5,6,6,7,7 - dodecarfluoroheptyloxy) - 3,3,4,4,5,5-hexafluoro-1-cyclopentene (Compound H), 1,2 - di(2,2,3,3,4,4,5,5,6,6,7,7 - dodecafluoroheptyloxy) - 3 - 3,4,4,5,5,6,6-octafluoro-1-cyclohexene (Compound I), prepared in the same manner, are tabulated in Tables I and II. Similar properties are obtainable when other fluoroalkanols and perfluoro cyclic olefins are employed.

EXAMPLE 3

Chlorine was bubbled through 10.6 parts of Compound G on a steam bath for a period of 4 hours and then distilled to obtain 10 parts of a clear oil having a boiling point of 110 degrees centigrade at 0.05 millimeter mercury vapor pressure and a refractive index of $n_D^{25.2}$ 1.3437. Infrared analysis showed no absorption in the double bond region confirming the product as 1,2-dichloro-1,2 - di(2,2,3,3,4,4,5,5,6,6,7,7 - dodecafluoroheptyloxy)-3,3,4,4,-tetrafluorocyclobutane. For convenience this compound will be identified as J.

The ethers of this invention possess a combination of fire resistance and wide usable temperature range which makes them quite unique and well suited for use as a force transmission fluid (hydraulic fluid). The excellent fire resistance of these ethers can be demonstrated by the results obtained in the Molten-metal Test in which the fluid under evaluation is dropped from a medicine dropper or poured from a test tube onto the surface of molten aluminum alloy which has been heated to about 1250° F. If spontaneous ignition does not occur, an ignition source, such as a spark or flame is placed in the vapors to determine if they can be ignited. In this test these ethers do not flash without a spark and with a spark are non-burning or are self-extinguishing.

The invented ethers are also useful as functional fluids in various other applications and thus can be used as an electronic coolant, a diffusion pump fluid, a synthetic lubricant and as a damping fluid.

As a result of the excellent physical properties of the compounds described above, improved hydraulic pressure devices can be prepared in accordance with this invention which comprise in combination a fluid chamber and an actuating fluid in said chamber, said fluid comprising the invented di- and tri-ethers alone or in combination with minor amounts of other materials such as dyes, lubricity agents and the like. In such a hydraulic apparatus wherein a movable member is actuated by the above-described compounds, performance characteristics are obtainable which are superior to those heretofore obtainable.

Because of the excellent fire resistance of the compounds of this invention and their exceptionally low melting point and good lubricity, such ethers can be utilized in those hydraulic systems wherein power must be transmitted and the frictional parts of the system lubricated by the hydraulic fluid utilized. Thus, the novel functional fluids of this invention find utility in the transmission of power in a hydraulic system having a pump therein supplying the power for the system. In such a system, the parts which are so lubricated include the frictional surfaces of the source of power, namely the pump, valves, operating pistons and cylinders, fluid motors, and in some cases, for machine tools, the ways, tables and slides. The hydraulic system may be of either the constant-volume or the variable-volume type of system.

The compositions of this invention can also contain dyes, pour point depressants, antioxidants, viscosity index improvers, such as polyalkylacrylates and polyalkylmethacrylates, lubricity agents and the like.

The pumps may be of various types, including the piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

TABLE I

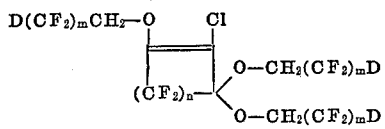

| | D | m | n | Percent, yield | B.P., °C. at mm. mercury pressure | B.P., °F.[1] | Ml. wt. calcd./ found[2] | $n_D^{25}$ | Infrared C=C absorption (cm.⁻¹) |
|---|---|---|---|---|---|---|---|---|---|
| Compound: | | | | | | | | | |
| A | F | 3 | 2 | 82.9 | 75/0.05 | 474 | 768/736 | 1.3325 | 1,673 |
| B | H | 4 | 2 | 73.6 | 135/0.1 | 586 | 865/820 | 1.3503 | 1,670 |
| C | H | 6 | 2 | 72.2 | 170/.08 | 618 | 1,165/1,234 | 1.3421 | 1,660 |
| D | H | 8 | 2 | 74.4 | 200/0.1 | 676 | 1,465/1,472 | 1.3386 | 1,665 |
| E | H | 6 | 1 | 54.9 | 170/0.1 | 561 | 1,115/1,077 | 1.3429 | 1,697 |
| F | H | 6 | 3 | 68.3 | 175/0.1 | 629 | 1,215/1,200 | 1.3440 | 1,649 |

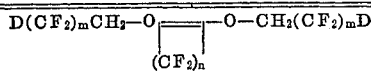

| | D | m | n | Percent, yield | B.P., °C. at mm. mercury pressure | B.P., °F.[1] | Ml. wt. calcd. found[2] | $n_D^{25}$ | Infrared C=C absorption (cm.⁻¹) |
|---|---|---|---|---|---|---|---|---|---|
| Compound: | | | | | | | | | |
| G | H | 6 | 2 | 53.1 | 105/0.1 | 543 | 786/823 | 1.3322 | 1,750 |
| H | H | 6 | 3 | 40.4 | 110/0.1 | 536 | 836/837 | 1.3331 | 1,728, 1,707 |
| I | H | 6 | 4 | 52.6 | 115/0.1 | 561 | 886/863 | 1.3317 | 1,711, 1.679 |

[1] Extrapolated boiling point from vapor pressure data.
[2] Molecular weights determined by osmometer (CHCl₃ solvent).

TABLE II.—PHYSICAL PROPERTIES

| | Viscosity (cs., °F.) | | | | | ASTM slope (100-210° F.) | Density (°F.) | | $T_D$(°F.) |
|---|---|---|---|---|---|---|---|---|---|
| | −40 | 0 | 100 | 210 | 400 | | 100 | 210 | |
| Compound: | | | | | | | | | |
| A | 7,800 | 392 | 8.0 | 1.47 | 0.38 | 1.21 | 1.6996 | 1.5790 | 518 |
| B | 79,000 | 3,700 | 42.4 | 4.11 | 0.73 | 0.98 | 1.7460 | 1.6366 | 523 |
| C | 40,500(−20) | 8,800 | 68.6 | 5.87 | 0.93 | 0.91 | | | 489 |
| D | | 4,700(32) | 162.0 | 9.69 | 1.26 | 0.86 | 1.8423 | 1.7289 | 504 |
| E | | 13,181 | 87.9 | 6.47 | 0.96 | 0.91 | 1.7891 | 1.6761 | 390 |
| F | | 33,915 | 132.9 | 8.05 | 1.05 | 0.89 | 1.8231 | 1.7132 | 480 |
| G[1] | 5,770 | 461 | 12.6 | 2.22 | 0.54 | 1.02 | 1.7676 | 1.6533 | >550 |
| H | 5,390 | 429 | 12.0 | 2.13 | 0.53 | 1.02 | 1.7891 | 1.6759 | 482 |
| I | 18,094 | 1,053 | 18.5 | 2.63 | 0.58 | 1.01 | 1.8010 | 1.6897 | >550 |
| J | 33,808 | 1,818 | 28.3 | 3.42 | 0.67 | 0.97 | 1.7874 | 1.6785 | 433 |

[1] A four-ball lubrication test was run on this fluid; conditions, 40 kg., 1,260 r.p.m., one hour, 400° F., tool steel on tool steel. Result, 0.88 mm. scar.

From the foregoing tables it will be apparent that one can obtain values intermediate to the compounds disclosed by utilizing mixtures of fluoroalcohols in place of a particular alcohol and also by the use of cyclic fluoroolefins containing 7 to 12 carbon atoms as well as the lower carbon atom fluoroolefins which have been used in the preceding examples. Additionally it will be apparent that the above products are fire resistant.

Example 4

A solution of 25 parts of 2,2,3,3,4,4-hexafluoro-1,5-pentanediol, 9.6 parts of sodium hydroxide, 15 parts of water and 26.6 parts of tetrahydrofuran was added slowly to a cold (approximately −15 degrees centigrade) solution of 19.4 parts of hexafluorocyclobutene in 35.5 parts of tetrahydrofuran. The temperature was maintained at a temperature of −15 to −10 degrees centigrade during the addition after which it was gradually warmed to about 22 degrees centigrade over a 3 hour period. The mixture was then heated to reflux conditions for 15 minutes. Then the mixture was cooled, diluted with 133.6 parts of methylene chloride and filtered to yield a white solid polymeric material. The filtrate was separated into organic and aqueous phases, the organic layer washed with a solution of sodium chloride and sodium carbonate and dried over magnesium sulfate. The solvent was then removed on a steam bath under water pump vacuum to yield a second polymer fraction. It is considered that the formula below correctly represents the polymers of this example.

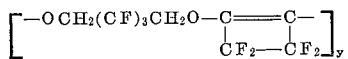

Similar polymers are obtained when other diols and or other olefins are subsitttuted for the olefins and diols of the preceding example.

While this invention has been described with respect to various specific examples and embodiments, it is to be understood that the invention is not limited thereto and that it can be variously practiced within the scope of the following claims.

What is claimed is:

1. Ethers of the formula

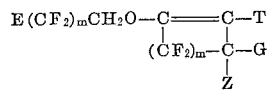

E is selected from the group consisting of hydrogen, fluorine and $CH_2OH$ and may be $CH_2OH$ only when T, G and Z are halogen;

G is selected from the group consisting of fluorine and $OCH_2(CF_2)_mD$ and is fluorine when T is

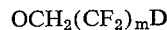

T is selected from the group consisting of bromine, chlorine and $OCH_2(CF_2)_mD$ and is a halogen when G and Z are $OCH_2(CF_2)_mD$;

Z is selected from the group consisting of fluorine and $OCH_2(CF_2)_mD$ and is fluorine when T is

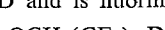

D is selected from the group consisting of hydrogen and fluorine and $n$ is a number from 1 to 7 and each $m$ expression is a number from 1 to 12.

2. A compound according to claim 1 wherein the ether is 1-chloro-3,3,4,4-tetrafluoro-2,5,5-tri(2,2,3,3,4,4,5,5,6,6,7,7-dodecafluoroheptyloxy)-1-cyclopentene.

3. A compound according to claim 1 wherein the ether is 1-chloro-3,3,4,4-tetrafluoro-2,5,5-tri(2,2,3,3,4,4,4-heptylfluorobutyloxy)-1-cyclopentene.

4. A compound according to claim 1 wherein the ether is 1 - chloro - 3,3,4,4 - tetrafluoro - 2,5,5 - tri(2,2,3,3,4,4,5,5-octafluoropentyloxy)-1-cyclopentene.

5. A compound according to claim 1 wherein the ether is 1 - chloro - 3,3,4,4 - tetrafluoro - 2,5,5 - tri(2,2,3,3,4,4,5,5,6,6,7,7,8,8,9,9 - hexadecafluorononyloxy) - 1 - cyclopentene.

6. A compound according to claim 1 wherein the ether is 1 - chloro - 33 - difluoro - 2,4,44 - tri(2,2,3,3,4,4,5,5,6,6,7,7-dodecafluoroheptyloxy)-1-cyclobutene.

7. A compound according to claim 1 wherein the ether is 1 - chloro - 3,3,4,4,5,5 - hexafluoro - 2,6,6 - tri(2,2,3,3,4,4,5,5,6,6,7,7-dodecafluoroheptyloxy)-1-cyclohexene.

8. A compound according to claim 1 wherein the ether is 1,2 - di(2,2,3,3,4,4,5,5,6,6,7,7 - dodecafluoroheptyloxy)-3,3,4,4-tetrafluoro-1-cyclobutene.

9. A compound according to claim 1 wherein the ether is 1,2 - di(2,2,3,3,4,4,5,5,6,6,7,7 - dodecafluoroheptyloxy)-3,3,4,4,5,5-hexafluoro-1-cyclopentene.

10. A compound according to claim 1 wherein the ether is 1,2-di(2,2,3,3,4,4,5,5,6,6,7,7-dodecafluoroheptyloxy)-3,3,4,4,5,5,6,6-octafluoro-1-cyclohexene.

11. A method of producing an unsaturated fluorine-containing alicyclic ether that comprises reacting a cyclic olefin of the formula

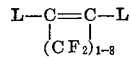

wherein L is selected from the group consisting of fluorine, bromine and chlorine with a fluoroalkanol containing from 1 to 12 carbon atoms and from 1 to 2 hydroxyl groups in the presence of an aqueous mixture of an alkali metal hydroxide and a water-miscible aprotic solvent at a temperature from $-50$ degrees to $+200$ degrees centigrade for about one-half to about 48 hours.

12. The method of claim 11 wherein the alkali metal hydroxide is sodium hydroxide and the aprotic solvent is tetrahydrofuran.

References Cited

UNITED STATES PATENTS 2,613,228 10/1952 Ruh _____ 260—611
2,982,786 5/1961 McCane _____ 260—611

OTHER REFERENCES

Park et al.: Jour. Amer. Chem. Soc., vol. 71 (1949), pp. 2337–2339.

Barr et al.: Jour. Amer. Chem. Soc., vol. 72 (1950), pp. 4480–4482.

Park et al.: Jour. Amer. Chem. Soc., vol. 73 (1951), pp. 2342–2345.

BERNARD HELFIN, Primary Examiner

U.S. Cl. X.R.

252—54, 60, 61, 65, 67, 73; 260—33.2, 91.1

UNITED STATES PATENT OFFICE
CERTIFICATE OF CORRECTION

Patent No. 3,497,563      Dated February 24, 1970

Inventor(s) Virgil W. Gash

It is certified that error appears in the above-identified patent and that said Letters Patent are hereby corrected as shown below:

Column 1, line 15, that portion of the formula reading $(CF_2)_m^-$     Should read     $(CF_2)_n^-$ Column 1, line 18, "elected" should read -- selected --.
Column 1, line 36, the formula should read -- $OCH_2(CF_2)_n D$ --.
Column 1, line 54, delete "which" and insert -- with --.
Column 2, line 12, delete "is". Column 4, line 28, "dodecarfluoroheptyl-" should read -- dodecafluoroheptyl- --. Column 4, line 31, "oxy)-3-3," should read -- oxy)-3,3,--. Column 7, line 24, that portion of the formula reading $(CF_2)_m^-$     Should read     $(CF_2)_n^-$ Column 8, line 4, " -33- " should read -- -3,3- --, and "-2,4,44-" should read -- -2,4,4- --.

Claim 1, Column 7, line 32, "$OCH_2(CF_2)_m D$" should read -- $OCH_2(CF_2)_n D$ --.

Signed and sealed this 15th day of February 1972.

(SEAL)
Attest:

EDWARD M. FLETCHER, JR.
Attesting Officer

ROBERT GOTTSCHALK
Commissioner of Patents